United States Patent [19]
Heintz

[11] 3,916,717
[45] Nov. 4, 1975

[54] SINGLE LEVER GEAR SHIFT CONTROL
[75] Inventor: Herman Heintz, Livonia, Mich.
[73] Assignee: Massey-Ferguson Inc., Detroit, Mich.
[22] Filed: Nov. 15, 1974
[21] Appl. No.: 524,102

[52] U.S. Cl. ............................... 74/473 R; 74/491
[51] Int. Cl.² ......................................... G05G 9/12
[58] Field of Search.......... 74/473 R, 475, 476, 477, 74/491

[56] References Cited
UNITED STATES PATENTS

| | | | |
|---|---|---|---|
| 2,221,976 | 11/1940 | Kurtz | 74/473 R |
| 2,694,943 | 11/1954 | Brumbaugh | 74/473 R |
| 3,242,757 | 3/1966 | Winkler et al. | 74/473 R |
| 3,645,145 | 2/1972 | Galas | 74/473 R |
| 3,707,094 | 12/1972 | Herbenar | 74/473 R |

Primary Examiner—Allan D. Herrmann
Attorney, Agent, or Firm—Thomas P. Lewandowski

[57] ABSTRACT

Transmission control apparatus including first and second shifting levers, the first shifting lever being fulcrummed for pivotal movement in a first shifting plane and the second shifting lever being fulcrummed for pivotal movement in second and third shifting planes. A control lever extends through a slotted guide plate and is guided thereby for movement in a neutral control plane intersected by first, second and third active control planes, the control lever being rotatably movable in the first, second and third control planes when moved to the respective intersections thereof with the neutral control plane. Shift mechanism is interconnected with the control lever and shifting levers and is operable to (1) cause the first shifting lever to move in the first shifting plane in response to corresponding movement of the control lever in the first control plane, (2) cause the second shifting lever to move in the second shifting plane in response to corresponding movement of the control lever in the second control plane with the first shifting lever located at any selected position in the first shifting plane, and (3) cause the second shifting lever to move in the third shifting plane in response to movement of the control lever in the third control plane with the first shifting lever located at any desired position in the first shifting plane.

21 Claims, 7 Drawing Figures

SINGLE LEVER GEAR SHIFT CONTROL

BACKGROUND OF THE INVENTION

1. Field of the Invention

This invention relates to transmission control apparatus, and is particularly concerned with apparatus for manually controlling the speed settings of variable speed transmissions particularly of the type used in tractors and similar industrial and construction vehicles.

2. Description of the Prior Art

In vehicle transmissions having a large number of speed settings, as is particularly the case with agricultural and industrial tractors, and similar vehicles, it is sometimes necessary to transmit motion from one or more manual control levers to a plurality of shifting members in order to transmit motion from the control lever to the shifting rails or the like of the transmission. As the number of settings of the transmission increases, the complexity of the shift mechanism for transmitting the motion of the control lever to the shifting members increases. Examples of prior art transmission controls are disclosed in U.S. Pat. Nos. 3,365,972; 3,417,634; 3,471,635; 3,500,697; 3,625,302; 3,648,536 and 3,707,094.

SUMMARY OF THE INVENTION

An object of this invention is to provide control apparatus for a transmission having multiple speed settings in which a single control lever is employed to change the settings of the transmission.

A further object of this invention is to provide apparatus for controlling a transmission having multiple speed settings wherein the motion of a single control lever is transmitted to a pair of shifting members connected with a transmission, one of the shifting members being selectively movable in two planes in response to shifting of the control lever.

In carrying out the foregoing, and other objects, transmission control apparatus according to the present invention includes first and second shifting members connected with the transmission for governing the speed settings of the transmission. The first shifting member is movable in a first shifting plane between at least one active position and neutral position. By "active" position is meant a position in which the transmission is conditioned to transmit power from the vehicle power plant to the vehicle drive wheels or some other component of the vehicle to be driven by the power plant. By "neutral" position is meant a position in which the particular shifting member involved does not cause the transmission to be coupled with the power plant of the vehicle so as to transmit power therefrom. The second shifting member is movable in a second shifting plane between at least one active position and neutral position, and is movable in a third shifting plane between at least one active position and neutral position.

A control lever is selectively movable in a neutral control plane intersected by first, second and third active control planes. The control lever is selectively movable in the first, second and third control planes when moved to the respective intersections thereof with the neutral control plane.

Interconnected with the control lever and shifting members is a shift mechanism that is operable to transmit motion from the control lever to the shifting members such that the shifting members have control positions determining the speed setting of the transmission corresponding to the positions of the control lever. The shift mechanism is operable to (1) cause the first shifting member to move in the first shifting plane in response to corresponding movement of the control lever in the first control plane, (2) cause the second shifting member to move in the second shifting plane in response to corresponding movement of the control lever in the second control plane with the first shifting member located at any selected position in the first shifting plane, and (3) cause the second shifting member to move in the third shifting plane in response to corresponding movement of the control lever in the third control plane with the first shifting member located at any selected position in the first shifting plane. In the particular embodiment disclosed, the first shifting member is a range control and the control lever has high and low range positions in the first control plane corresponding to high and low range positions of the first shifting member, and the second shifting member has three transmission speed settings in the second and third shifting planes corresponding to settings of the control lever in the second and third control planes to provide a six-speed transmission, or three speeds in each of the high and low range settings.

Other objects, advantages and features of the invention will become apparent from the following description taken in connection with the accompanying drawings.

DESCRIPTION OF THE PREFERRED EMBODIMENT

Figure 1:
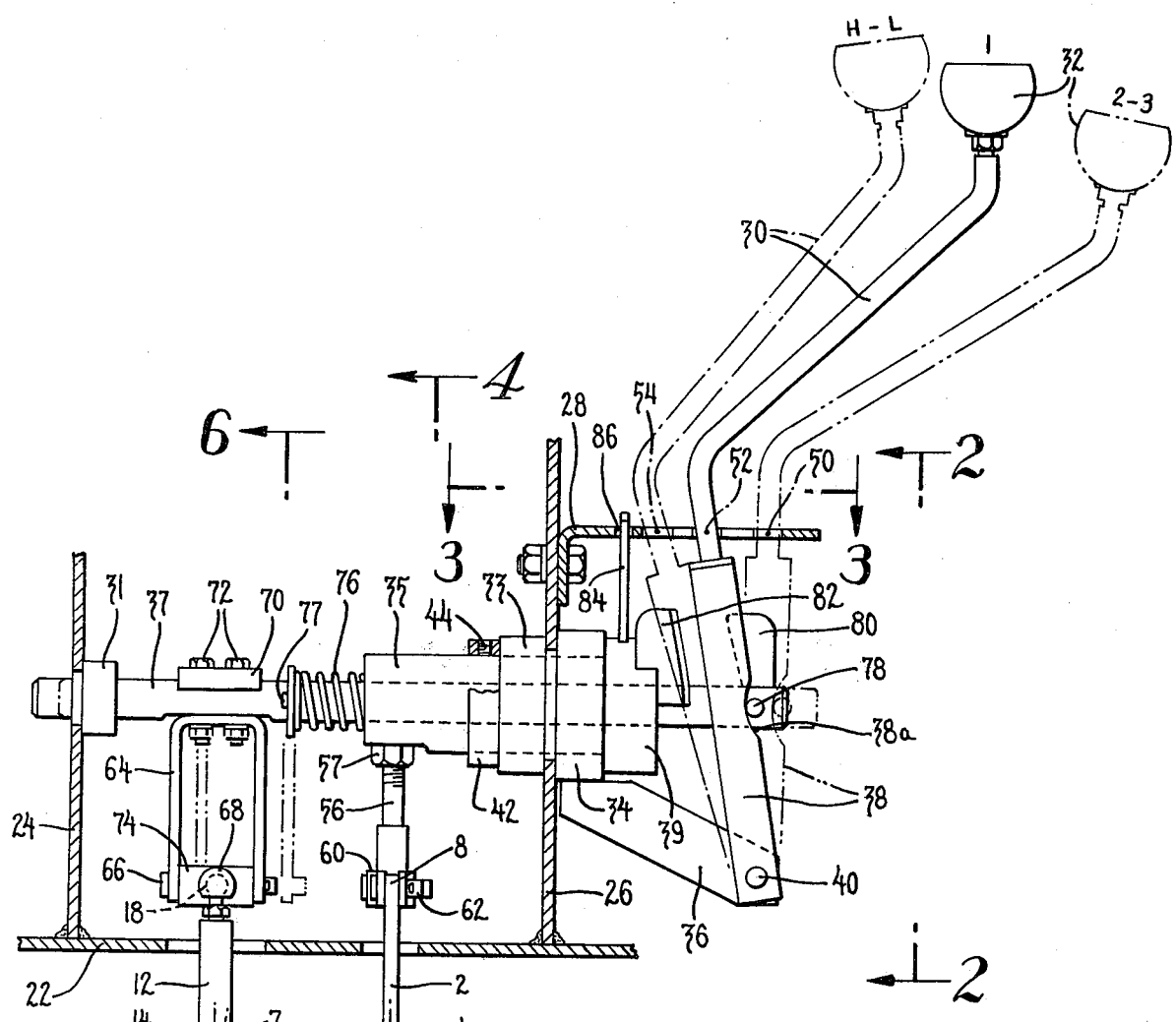
FIG. 1 is an elevational view of transmission control apparatus embodying the present invention.
Figure 2:
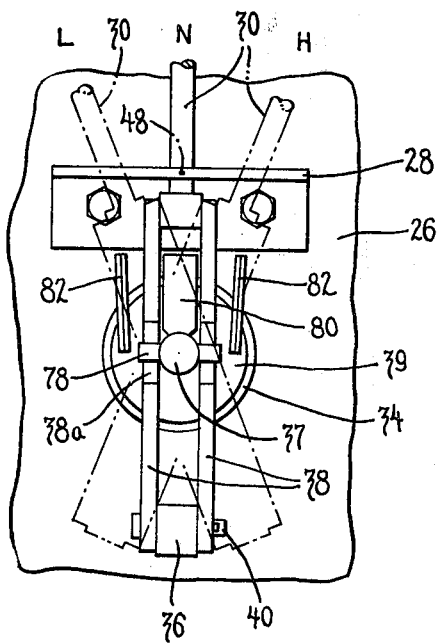
FIG. 2 is an end view as viewed along lines 2—2 of FIG. 1.
Figure 4:
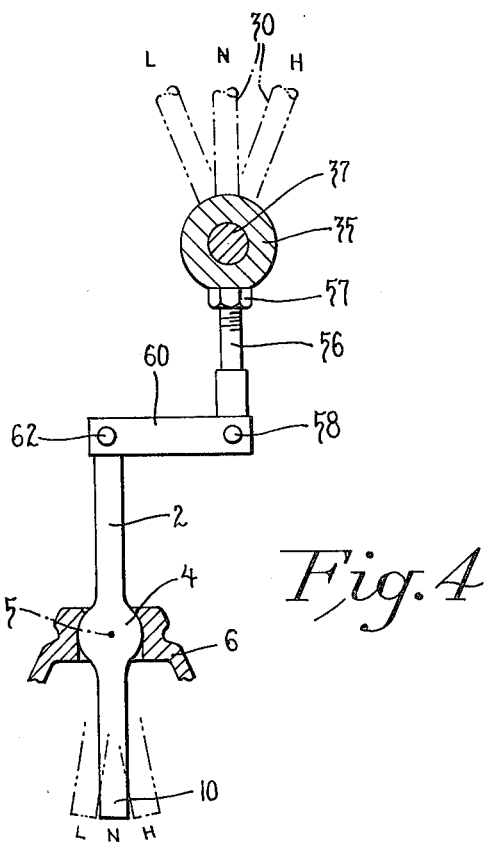
FIG. 4 is a sectional view taken along lines 4—4 of FIG. 1.

In FIGS. 1 and 2, reference numeral 2 indicates a first shifting lever formed with a ball fulcrum member 4 mounted in a bearing or socket member 6. The shifting lever 2 has an input end 8 and an output end 10, the output end 10 being adapted to transmit motion to transmission speed control element such as a shift rail, gear element, or the like so that pivotal movement of the shifting lever 2 causes movement of such speed control element with which the output end 10 is adapted to engage. As illustrated by the phantom line positions of the output end 10 in FIG. 4, the shifting lever 2 is pivotally movable in a first shifting plane 3 about an axis 5 transverse to plane 3 (FIGS. 1 and 4). As is set forth in greater detail below, shifting lever 2, in the illustrated embodiment, is a range control for a transmission having high and low range settings. The control positions of lever 2 in the first shifting plane 3 are illustrated in FIG. 4 at "L", "N" and "H" for low range, neutral and high range settings, respectively, of the transmission.

Figure 6:
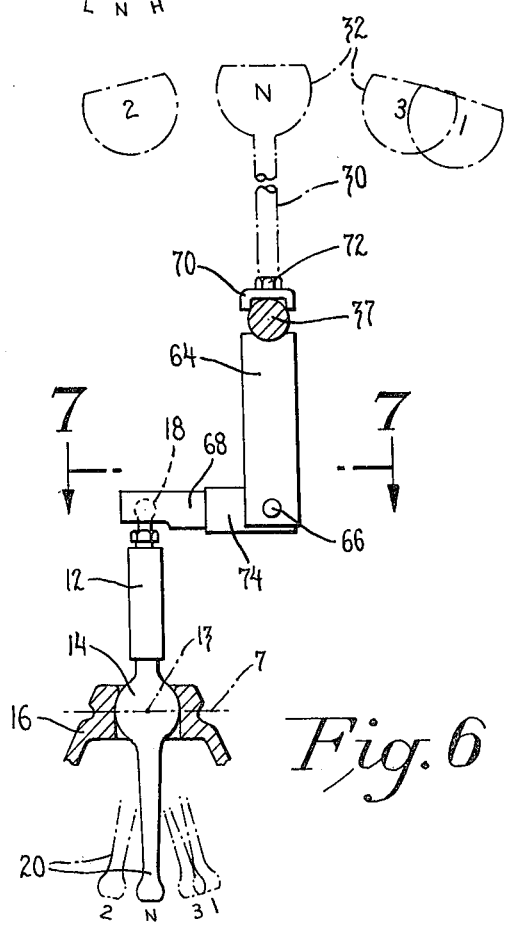
FIG. 6 is a view taken along lines 6—6 of FIG. 1.

In FIGS. 1 and 6, reference numeral 12 indicates a second shifting lever formed with a ball fulcrum member 14 mounted in a bearing or socket member 16. Shifting lever 12 has an input end 18 in the form of a spherical or ball shaped end, and an output end 20. The output end 20 is also adapted to be engaged with transmission speed control elements such as shifting rails, gear elements, or the like, so that pivotal movement of the shifting lever 12 will cause the transmission speed control element engaged by the output end 20 to assume a position or setting determined by the position of the lever 12.

Shifting lever 12 is pivotal about an axis 7 (FIGS. 1 and 6) between a second shifting plane 9 and a third shifting plane 11. The second shifting plane 9 is perpendicular to a pivotal axis 13 of lever 12, and the third shifting plane 11 is perpendicular to a pivotal axis 15 of lever 12. In the illustrated embodiment, the shifting lever 12 controls first, second and third speed settings of the transmission. When lever 12 is actuated about axis 7 to the third shifting plane 11, it is pivotal about axis 15 in plane 11 between first speed and neutral positions indicated, respectively, as positions "1" and "N" in FIG. 6. When lever 12 is in the second shifting plane 9 (the full-line position in FIG. 1), it is pivotal about axis 13 in plane 9 between second, neutral and third speed positions indicated, respectively, as positions "2", "N" and "3" in FIG. 6.

The first and second shifting levers 2 and 12, respectively, project upwardly in FIG. 1 through spaced openings formed in a platform member 22. Spaced upright support members 24 and 26 are supported on the horizontal platform 22 on opposite sides of the shifting levers 2 and 12. Secured to and projecting horizontally from the upright support member 26 is a slotted guide plate 28 for guiding the movement of a control lever 30 having a knob 32 mounted on its outer end.

As is set forth in greater detail below, shift mechanism interconnects the control lever 30 with the shifting levers 2 and 12 for transmitting motion to the shifting levers 2 and 12 from the control lever 30. Annular bearing members 31 and 33 are respectively welded, or otherwise secured, to the support members 24 and 26. The shift mechanism includes a motion transmitting sleeve 35 rotatably supported in bearing 33, and a motion transmitting rod 37 rotatably supported near one end in the annular bearing 31, the other end of rod 37 being rotatably received in the sleeve 35. The motion transmitting sleeve member 35 is formed with an enlarged end portion 39, and a control lever mounting collar 34 is rotatably mounted on the motion transmitting sleeve member 35 and is received between the support member 26 and the enlarged end portion 39. The control lever mounting collar 34 is rotatable with respect to the sleeve 35. A retaining collar 42 is coaxially received on the motion transmitting sleeve member 35 and is secured against axial movement with respect thereto by a set screw 44.

Control lever 30 has a lower, slotted end portion defined by a pair of spaced bars 38. Projecting from the control lever mounting member 34 is an arm 36 (FIG. 1), and the slotted end portion 38 of control lever 30 is pivotally connected with the end of arm 36 by a pin 40, the motion transmitting rod 37 being received at one end in the slot defined by bars 38. As indicated in FIG. 1 by the full line position and two phantom line positions of the control lever 30, the control lever 30 is pivotally movable about the axis of pin 40 toward and away from the support member 26 along the length of rod 37 and in a direction parallel to the axis of rotation of the mounting member 34. The control lever 30 is also rotatable about the common axis of the motion transmitting members 35, 37 and mounting member 34 due to the rotatable mounting of member 34 on the sleeve member 35.

The control lever 30 projects through a guide slot 46 formed in the guide plate 28 (FIG. 3), and the pattern of movement of the control lever 30 is determined by the configuration of the slot 46. The slot 46 has a central portion 47, an outer end portion 49, an intermediate portion 51, and an inner end portion 53, portions 49, 51 and 53 each extending transversely of the central portion 47. The central portion 47 defines a neutral control plane 48 which is intersected by first, second and third control planes 50, 52 and 54 defined respectively by portions 49, 51 and 53 of the slot 46. Control lever 30 is movable toward and away from the support member 26 about the pivot pin 40 in the neutral control plane 48. Control lever 30 is rotatably movable about the axis of the mounting member 34 in the first, second and third control planes 50, 52 and 54 when moved to the respective intersections thereof with the neutral control plane 48.

The motion transmitting sleeve 35 is connected with the first shifting lever 2, while the motion transmitting rod 37 is connected with the second shifting lever 12. Depending radially from sleeve 35 is a lever 56 which is threadedly engaged with a nut 57 welded or otherwise fixed to sleeve 35. The lower end of lever 56 as viewed in FIG. 4 is pivotally connected by a pin 58 with one end of a link 60, the other end of the link 60 being connected by a pin 62 with the input end of the shifting lever 2. As is apparent from FIG. 4, rotation of the motion transmitting sleeve 35 in a clockwise direction causes counterclockwise rotation of the shifting lever 2 in the first shifting plane 3 about axis 5. Conversely, counterclockwise rotation of sleeve 35 causes clockwise rotation of lever 2 in the first shifting plane 3 about axis 5.

Figure 7:
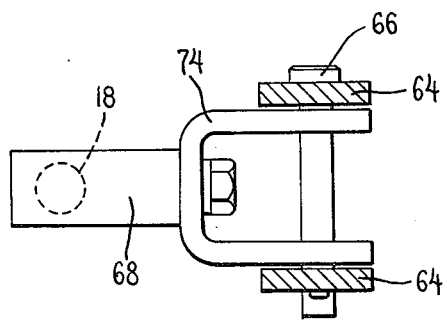
FIG. 7 is a sectional view taken along lines 7—7 of FIG. 6.

Depending radially from the motion transmitting rod 37 is a U-shaped lever 64 which is pivotally connected at the lower ends of its arms with the arms of the U-shaped portion 74 of a link 68 by a pin 66. The other end of the link 68 is formed with a socket for receiving the spherical input end 18 of the second shifting lever 12. Lever 64 is secured to the motion transmitting rod 37 by fasteners 72 extending through a clamping member 70 positioned on the opposite side of the motion transmitting rod 37 from lever 64. Lever 68 has its U-shaped end portion 74 (FIG. 7) received between the legs of the U-shaped lever 64 so that both axial and rotative motion of the motion transmitting rod 37 can be transmitted to the second shifting lever 12.

The motion transmitting rod 37 has a first axial position illustrated in full lines in FIG. 1, and a second axial position illustrated in phantom lines in FIG. 1. In the first, full line axial position of rod 37 in FIG. 1, the second shifting lever 12 lies in the first shifting plane 9 as illustrated by the full line position of lever 12 in FIG. 1. When the rod 37 is shifted to the right in FIG. 1 to the second, phantom line axial position, the second shifting lever 12 pivots clockwise about axis 7, as viewed in FIG. 1, so as to lie in the third shifting plane 11 as illustrated by the phantom line position of lever 12 in FIG. 1.

Rod 37 is biased to the first, full line axial position of FIG. 1 by a spring 76 having one end seated against the sleeve 35, and its other end seated against a transverse pin 77. Rod 37 extends through the slotted portion 38 of lever 30, and a transverse pin 78 is engageable by recesses 38a formed in bars 38 of lever 30 as the lever 30 pivots about pin 40 in a clockwise direction in FIG. 1 to the first control plane 50. As the control lever 30 moves clockwise about pin 40 to the first control plane 50, it engages pin 78 and carries rod 37 to its second axial position to, in turn, move the shifting lever 12 to the third shifting plane indicated in phantom lines in FIG. 1. When the control lever 30 is moved from the first control plane 50, spring 76 causes rod 37 to return to the first, full line axial position which results in lever 12 being returned to the second shifting plane illustrated in full lines in FIG. 1.

In order to transmit rotary motion of the control lever 30 to rod 37, a coupling arm 80 projects radially from rod 37 near the right-hand end thereof in FIG. 1. The coupling arm 80 is received in the slotted portion 38 of the control lever 30 when control lever is in either the second or third control planes 52, 50. The engagement of the coupling arm 80 with portion 38 of the control lever causes rod 37 to rotate in response to rotation of control lever 30. Consequently, when control lever 30 rotates in the control plane 50, rod 37 is shifted to the second axial position indicated by the phantom lines in FIG. 1, which motion of rod 37 causes the shifting lever 12 to pivot clockwise about axis 7 to the neutral position in plane 11. Subsequent rotation of the control lever 30 in control plane 50 about the axis of member 34 results in corresponding rotation of the shifting rod 37, which rotation is transmitted through lever 64 and link 68 to cause rotation of lever 12 in the third shifting plane. when the control lever 30 moves along the neutral control plane 48 from the first control plane 50 to the second control plane 52, spring 76 causes rod 37 to return to the first axial position, which motion of rod 37 causes lever 12 to pivot counterclockwise about axis 7 in FIG. 1 and return to the second shifting plane 9. Subsequent rotation of the control lever 30 in the second control plane 52 causes the shifting lever 12 to rotate in the second shifting plane 9.

Figure 5:
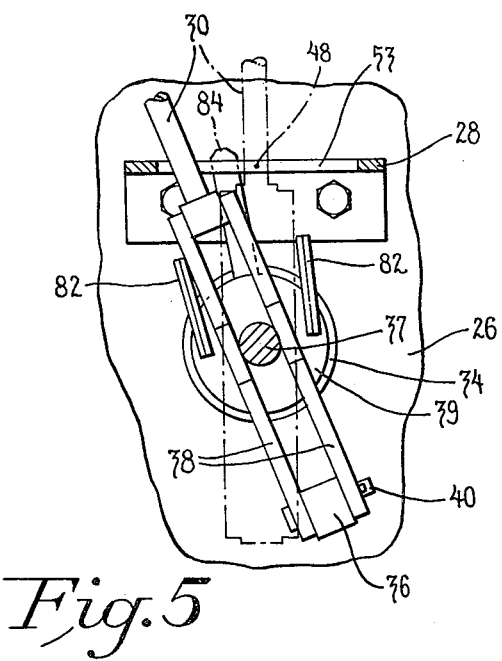
FIG. 5 is a view similar to FIG. 2 with the parts shown in a different position.

When control lever 30 moves to the intersection of the first control plane 54 with the neutral control plane 48 (the phantom line position of lever 30 in FIG. 5), the lever 30 will be received between the spaced ears 82. Counterclockwise motion of lever 30 from the phantom line, neutral, position of lever 30 in FIG. 5 to its full-line position will cause lever 30 to engage the left-hand ear 82 and cause counterclockwise rotation of sleeve 35. Conversely, clockwise rotation of lever 30 from its phantom-line, neutral position of FIG. 5 will cause lever 30 to engage the right-hand ear 82 and impart clockwise rotation to sleeve 35.

The spacing of the coupling ears 82 is such that lever 30 can disengage from sleeve 35 in any angular position of sleeve 35 relative to the rotary axis of sleeve 35, and hence in any corresponding position of shifting lever 2 in the shifting plane 3. For example, the shifting lever 2 can first be shifted by lever 30 to the low range position indicated at "L" in FIG. 4, after which lever 30 can, without moving lever 2 from the low range position, move out of engagement with ears 82 to shift the shifting lever 12 to one of its control positions.

Figure 3:
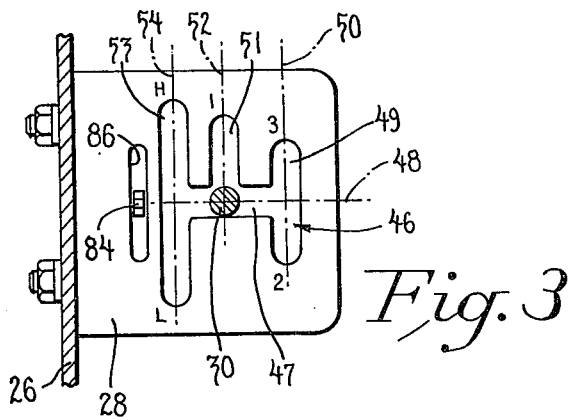
FIG. 3 is a view taken along lines 3—3 of FIG. 1.

Projecting radially upwardly from the enlarged portion 39 of sleeve 35 is an indicating arm 84, the upper end of which is received in a slot 86 in the guide plate 28 (FIGS. 1 and 3). The indicating arm 84 indicates to the operator the angular position of sleeve 35, and hence the setting of the shifting lever 12. Appropriate indicia may be provided in the guide plate 28 alongside slot 86 for cooperation with arm 84 to indicate the setting of shifting lever 2.

As pointed out previously, the shifting lever 2 may be a transmission range control with low and high range active settings (in addition to a neutral setting), while the shifting lever 12 may be a speed control with first, second and third speed active settings (in addition to neutral settings in each of the second and third shifting planes 9 and 11). Control lever 30 has positions indicated on guide plate 28 corresponding to the various control positions of shifting levers 2 and 12. Positions "H" and "L" of the control lever are designated at opposite ends of the slot portion 53, in control plane 54 on opposite sides of the neutral control plane 48, corresponding to high and low range settings of shifting lever 2 in the first shifting plane 3. The second shifting lever 12 has a first speed position in the third shifting plane 11 (FIG. 6), and the corresponding first speed position of control lever 30 is indicated as position "1" at the end of slot portion 51, in control plane 52. The second shifting lever 12 has second and third speed positions in the shifting plane 9 as indicated in FIG. 6, and control lever 30 has corresponding speed positions indicated as positions "2" and "3" at the opposite ends of slot portion 49, in the control plane 50 on opposite sides of the neutral control plane.

While a specific embodiment of the invention has been described in the foregoing specification and is illustrated in the accompanying drawings, it should be understood that the invention is not limited to the exact construction shown. To the contrary, various alterations in the construction and arrangement of parts, all falling within the scope and spirit of the invention, will be apparent to those skilled in the art.

The embodiments of the present invention in which an exclusive property or privilege is claimed are defined as follows:

1. Transmission control apparatus comprising a first shifting member movable in a first shifting plane between at least one active position and neutral position; a second shifting member movable in a second shifting plane between at least one active position and neutral position, and in a third shifting plane between at least one active position and neutral position; a single control lever selectively movable in a neutral control plane intersected by first, second and third control planes, said control lever being selectively movable in said first, second and third control planes when moved to the respective intersections thereof with said neutral control plane; and shift mechanism interconnected with said control lever and shifting members operable to (1) cause said first shifting member to move in said first shifting plane in response to corresponding movement of said control lever in said first control plane, (2) cause said second shifting member to move in said second shifting plane in response to corresponding movement of said control lever in said second control plane with said first shifting member located at any selected position in said first shifting plane, and (3) cause said second shifting member to move in said third control plane in response to corresponding movement of said control lever in said third control plane with said first shifting member located at any desired position in said first shifting plane.

2. Apparatus as claimed in claim 1 wherein said control lever is supported for rotatable movement in said first, second and third control planes, and is supported for movement along the axis of said rotatable movement in said neutral control plane.

3. Apparatus as claimed in claim 2 wherein said shift mechanism includes a pair of coaxial, rotatable motion transmitting members each of which is connected with one of said shifting members to transmit motion thereto in response to movement of said control lever.

4. Apparatus as claimed in claim 3 wherein one of said motion transmitting members is movable longitudinally between first and second axial positions, said second shifting member being positioned in said second shifting plane when said one motion transmitting member is in said first axial position and being positioned in said third shifting plane when said one motion transmitting member is in said second axial position.

5. Apparatus as claimed in claim 4 including biasing means biasing said one motion transmitting member to said first axial position, said one motion transmitting member being movable by said control lever to said second axial position when said control lever moves to said first control plane, said biasing means causing said one motion transmitting member to return to said first axial position when said control lever moves from said first control plane.

6. Apparatus as claimed in claim 5 further including coupling means on said one motion transmitting member engageable by said control lever when said control lever is in said first and second control planes to rotatably couple said one motion transmitting member to said control lever and cause rotation of said one motion transmitting member in response to rotation of said control lever.

7. Apparatus as claimed in claim 6 further including coupling means on the other of said motion transmitting members engageable by said control lever when said control lever is in said third control plane to rotatably couple said other motion transmitting member to said control lever to cause rotation of said other motion transmitting member in response to rotation of said control lever.

8. Apparatus as claimed in claim 7 wherein said last named coupling means comprises a pair of ears on said other motion transmitting member spaced from each other on opposite sides of the rotary axis of said other motion transmitting member a distance sufficient to permit said control lever to disengage from said other motion transmitting member in any desired position of said first shifting member in said first shifting plane.

9. Apparatus as claimed in claim 8 wherein said coupling means on said one motion transmitting member is disengageable from said control lever only when said control lever is in said control neutral plane such that said second shifting member is in a neutral position except when said control lever is located in one of said first and second control planes out of said neutral control plane.

10. Transmission control apparatus comprising: first and second shifting levers, said first shifting lever being fulcrummed for pivotal movement in a first shifting plane between at least one active position and neutral position, said second shifting lever being fulcrummed for pivotal movement in a second shifting plane between at least one active position and neutral position and for pivotal movement in a third shifting plane between at least one active position and neutral position; a control lever support, a control lever mounting member rotatably mounted on said control lever support, and a control lever secured to said control lever mounting member such that the control lever is non-rotatable with respect thereto but is movable toward and away from said control lever mounting member in a direction parallel to the rotary axis of said mounting member; a guide plate mounted on said control lever support, a guide slot in said guide plate receiving said control lever and confining said control lever to move toward and away from said mounting member in a neutral control plane intersected by first, second and third control planes; said control lever being rotatable about the axis of said mounting member in said first, second and third control planes; and shift mechanism interconnected with said control lever and shifting levers operable to (1) cause said first shifting lever to move in said first shifting plane in response to corresponding rotary movement of said control lever in said first control plane, (2) cause said second shifting lever to move in said second shifting plane in response to corresponding rotary movement of said control lever in said second control plane with said first shifting member located at any desired position in said first shifting plane, and (3) cause said second shifting lever to move in said third shifting plane in response to corresponding rotary movement of said control lever in said third control plane with said first shifting member located at any desired position in said first shifting plane.

11. Apparatus as claimed in claim 10 wherein said first shifting lever is a high and low range control, and said control lever has high and low range positions in said first control plane on opposite sides of said neutral control plane corresponding to high and low range positions in said first shifting plane of said first shifting lever, and said second shifting lever has transmission speed positions in said second and third shifting planes corresponding to transmission speed positions of said control lever in said second and third control planes.

12. Apparatus as claimed in claim 11 wherein said control lever has a first speed position in said second control plane on one side of said neutral control plane corresponding to a first speed position of said second shifting lever in said second shifting plane, and second and third speed positions in said third control plane on opposite sides of said neutral control plane corresponding to second and third speed positions of said second shifting lever in said third shifting plane.

13. Apparatus as claimed in claim 12 wherein said shift mechanism includes a pair of coaxial, rotatable motion transmitting members each of which is connected with one of said shifting levers to transmit motion thereto in response to movement of said control lever.

14. Apparatus as claimed in claim 13 wherein one of said motion transmitting members is movable longitudinally between first and second axial positions, said second shifting lever being positioned in said second shifting plane when said one motion transmitting member is in said first axial position and being positioned in said third shifting plane when said one motion transmitting member is in said second axial position.

15. Apparatus as claimed in claim 14 including biasing means biasing said one motion transmitting member to said first axial position, said one motion transmitting member being movable by said control lever to said second axial position when said control lever moves to said first control plane, said biasing means causing said one motion transmitting member to return to said first axial position when said control lever moves from said first control plane.

16. Apparatus as claimed in claim 15 further including coupling means on said one motion transmitting member engageable by said control lever when said control lever is in said first and second control planes to rotatably couple said one motion transmitting member to said control lever and cause rotation of said one motion transmitting member in response to rotation of said control lever.

17. Apparatus as claimed in claim 16 further including coupling means on the other of said motion transmitting members engageable by said control lever when said control lever is in said third control plane to rotatably couple said other motion transmitting member to said control lever to cause rotation of said other motion transmitting member in response to rotation of said control lever.

18. Apparatus as claimed in claim 17 wherein said last named coupling means comprises a pair of ears on said other motion transmitting member spaced from each other on opposite sides of the rotary axis of said other motion transmitting member a distance sufficient to permit said control lever to disengage from said other motion transmitting member in any desired position of said first shifting member in said first shifting plane.

19. Apparatus as claimed in claim 18 wherein said coupling means on said one motion transmitting member is disengageable from said control lever only when said control lever is in said neutral control plane such that said second shifting lever is in a neutral position except when said control lever is located in one of said first and second control planes out of said neutral control plane.

20. Transmission control apparatus comprising: a control lever support; a control lever mounting member rotatably mounted on said control lever support; a control lever; means securing said control to said control lever mounting member such that said control lever is non-rotatable with respect thereto but is movable toward and away from said control lever mounting member in a direction parallel to the rotary axis of said mounting member; a motion transmitting sleeve member rotatably mounted on said support member in coaxial relationship with said control lever mounting member, said sleeve member being rotatable with respect to said control lever mounting member; a motion transmitting rod member rotatably mounted on said support member, said rod member being coaxially received in said sleeve member and being movable longitudinally with respect to said support between first and second axial positions, said rod member being biased to said first axial position; said control lever having a slotted portion with a portion of said rod member projecting therethrough; a pin on said rod member located on the opposite side of said control lever from said control lever mounting member such that said control lever is engageable with said pin to cause said rod member to move to its second axial position upon movement of said control lever away from said control lever mounting member to a first axial position with respect to said control lever mounting member; a rod member coupling arm projecting radially from said rod member and receivable in the slotted portion of said control lever when said control lever is in said first axial position and a second axial position nearer to said control lever mounting member than said first axial position to rotatably couple said control lever with said rod member when said control lever is in one of said first and second axial positions; and sleeve member coupling means on said sleeve member engageable by said control lever when said control lever is in a third axial position between said second axial position and said control lever mounting member to rotatably couple said control lever with said sleeve member when said control lever is in said third axial position.

21. Apparatus as claimed in claim 20 further including first and second shifting members; said first shifting member having an input end and an output end, means connecting the input end of said first shifting member with said motion transmitting sleeve member to cause the output end of said first shifting member to move in a first shifting plane in response to rotation of said sleeve member; said second shifting member having an input end and an output end, means connecting the input end of said second shifting member with said motion transmitting rod member to cause the output end of said second shifting member to move in a second shifting plane in response to rotation of said rod member in the first axial position thereof, and to cause the output end of said second shifting member to move in a third control plane in response to rotation of said rod member in the second axial position thereof.

* * * * *